2,920,513
Patented Jan. 12, 1960

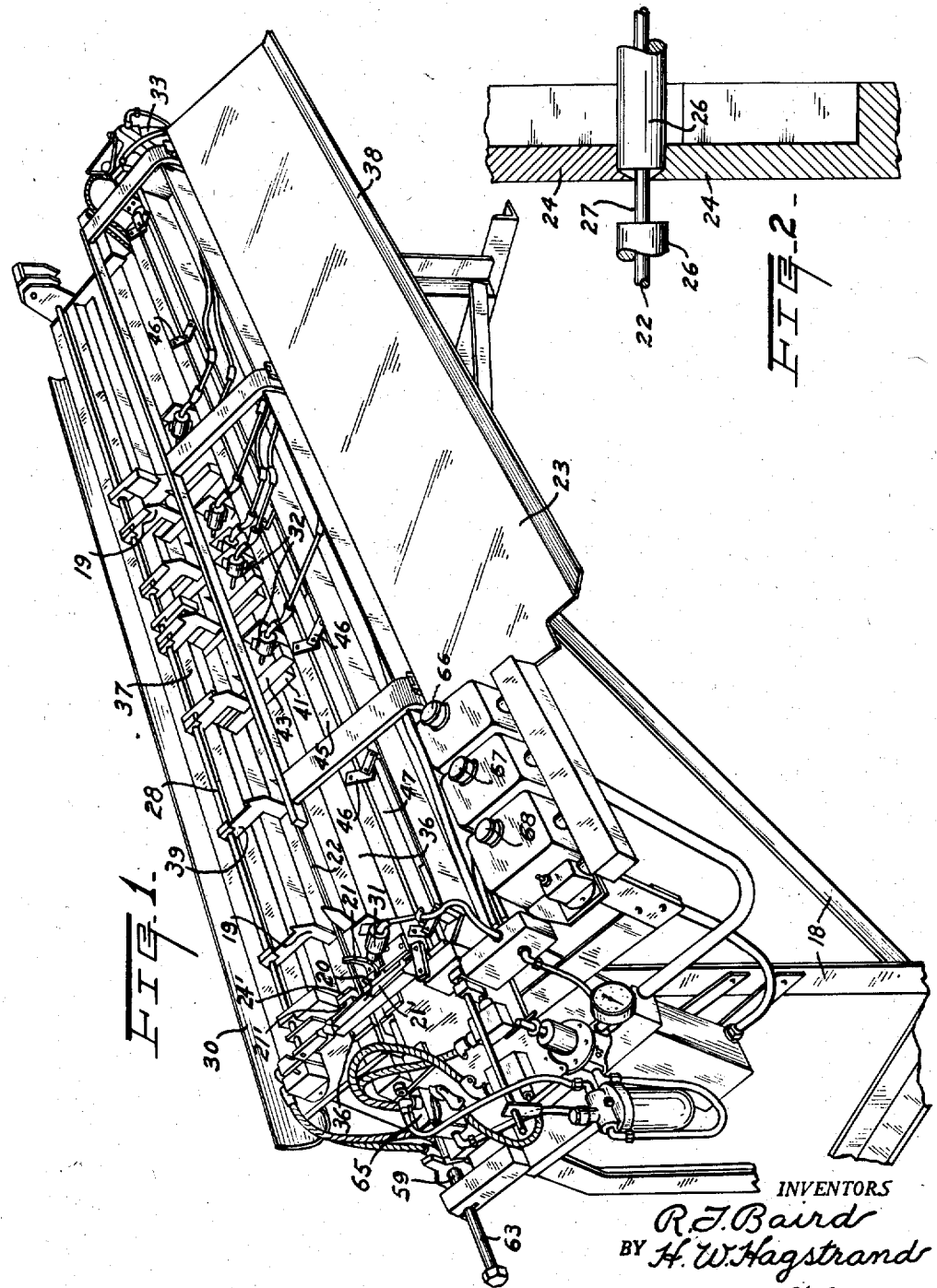

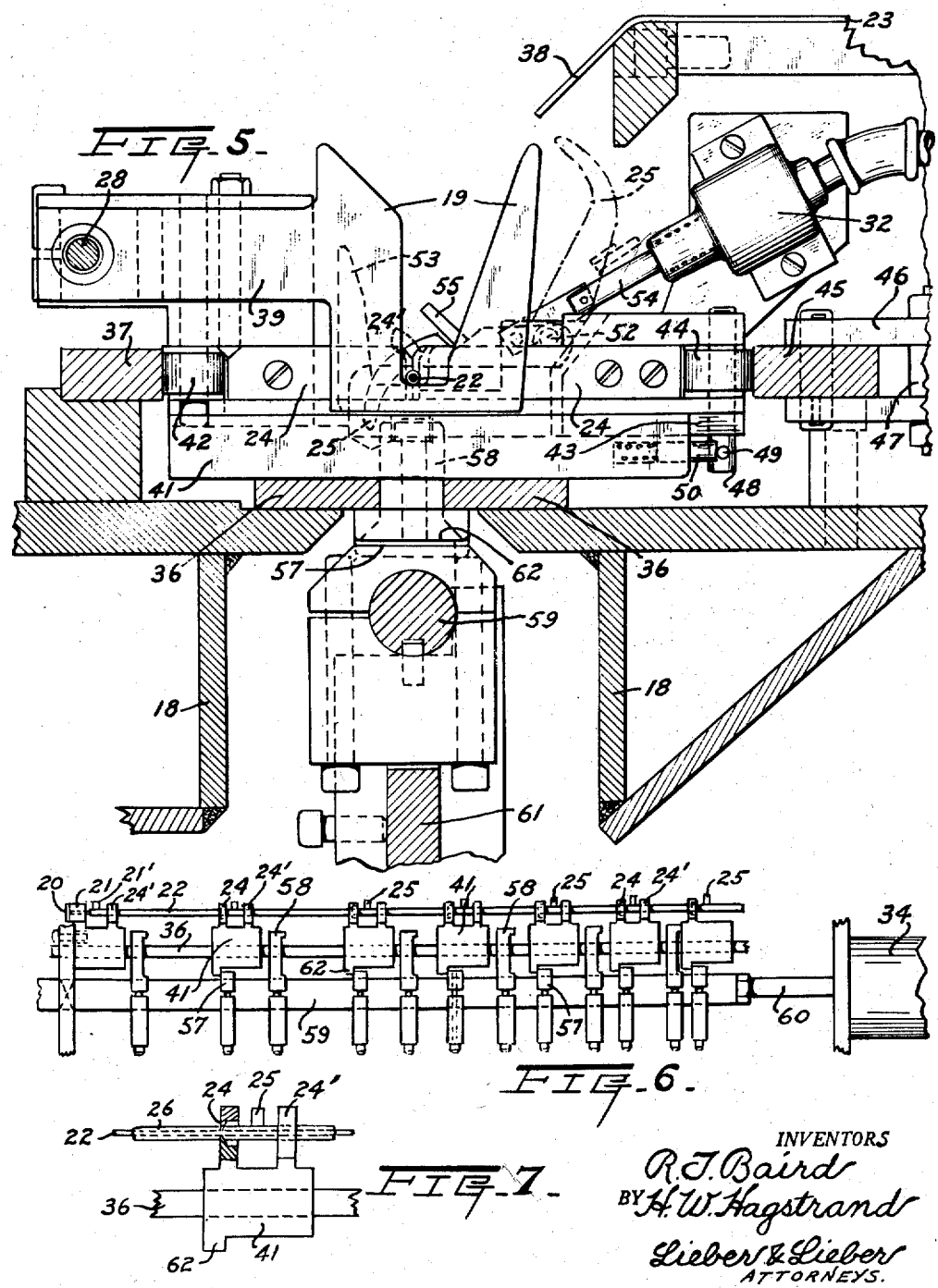

2,920,513

APPARATUS AND METHOD FOR MEDIALLY STRIPPING INSULATED WIRES

Russell T. Baird and Helge W. Hagstrand, Milwaukee, Wis., assignors to Artos Engineering Company, Milwaukee, Wis., a corporation of Wisconsin Application April 16, 1956, Serial No. 578,496

4 Claims. (Cl. 81—9.51)

The present invention relates generally to improvements in the art of producing electric current conductors, and relates more specifically to an improved method of and apparatus for locally stripping insulation covered wires at one or more zones intermediate the ends thereof.

The primary object of our invention is to provide an improved method of removing the coverings from insulated wires or the like, at selected localities intermediate the ends thereof so as to expose bared wire portions of predetermined length at such localities.

Insulation covered wires are used extensively as electrical conductors for various kinds of equipment, and it is frequently desirable when installing diverse electrical systems to have a continuous wire which connects remote points, also provided with one or more branch leads electrically connected thereto at local zones intermediate such points. In order to do this so as to insure direct and effective attachment of these intermediate leads to the main wire, it is necessary to remove the insulation at such local zones while maintaining the portions of the main conductor thoroughly insulated between the successive zones. In many instances of this nature it is also desirable to have the local bared zones of different selected lengths, and in order to insure production of such conductors at minimum cost the intermediate local stripping must be accomplished rapidly, accurately and without damaging the wires and the retained insulation.

Some insulation covered wires are solid while others are composed of numerous strands, and the insulation in some cases rather loosely embraces the conductor while in others it rather snugly engages and adheres to the wire, but in any event the insulation can be stripped longitudinally of the conductor and it has long been common practice to so remove insulation from one or both extreme ends of elongated conductors. However in order to provide such bared zones intermediate the wire ends, it has heretofore been necessary to resort to burning or some other more tedious procedure so as to provide such local zones, without displacing the intervening sections of the insulation, and these prior methods were not only costly and injurious to delicate wires but they frequently produced inaccurate spacing and lengths of the bared zones.

It is therefore an important object of the present invention to provide an improved method of facilitating such local intermediate zone stripping of insulation covered wires in a more accurate and rapid manner than was possible with the previous methods.

Another important object of this invention is to provide simple but effective apparatus for commercially exploiting the improved stripping method with utmost precision and dependability and without damaging the conductors.

A further important object of the invention is to provide a new system for producing bared local zones of any predetermined lengths and at any desired locality along insulation covered electrical conductors of diverse dimensions.

Still another important object of our invention is to provide improved mechanism which is adjustable and operable to automatically strip the insulation at any desired locality and for any predetermined distance from successive precut insulation covered wires deposited within the machine, and to likewise deliver the finished product from the mechanism.

These and other more specific objects and advantages of the invention will be apparent from the following detailed description.

A clear conception of the several steps involved in the improved insulated wire stripping method, and of the construction and operation of a commercial machine for exploiting the method, may be had by referring to the drawings accompanying and forming a part of this specification wherein like reference characters designate the same or similar parts in the various views.

Fig. 1 is a perspective view of a commercial machine for carrying on the present method of medially stripping insulated wires to produce conductors having stripped zones of any desired length located at any desired position intermediate the wire ends, showing the wire supply pan swung away from its normal operating position in order to reveal normally hidden structure;

Fig. 2 is an enlarged fragmentary section taken longitudinally through one of the insulation cutting and stripping zones of the machine;

Fig. 5 is a similarly enlarged transverse vertical section through a fragment of the same unit taken directly in advance of one of the wire positioning and ejector guides, looking toward one of the insulation cutting and stripping zones and showing the wire supply pan in normal operating position;

Fig. 6 is a somewhat diagrammatic side view of the insulation cutting and stripping zones and wire holding mechanism;

Fig. 7 is a somewhat enlarged and diagrammatic side view of one set of the insulation cutting knives and the adjacent wire clamp;

Figure 3:
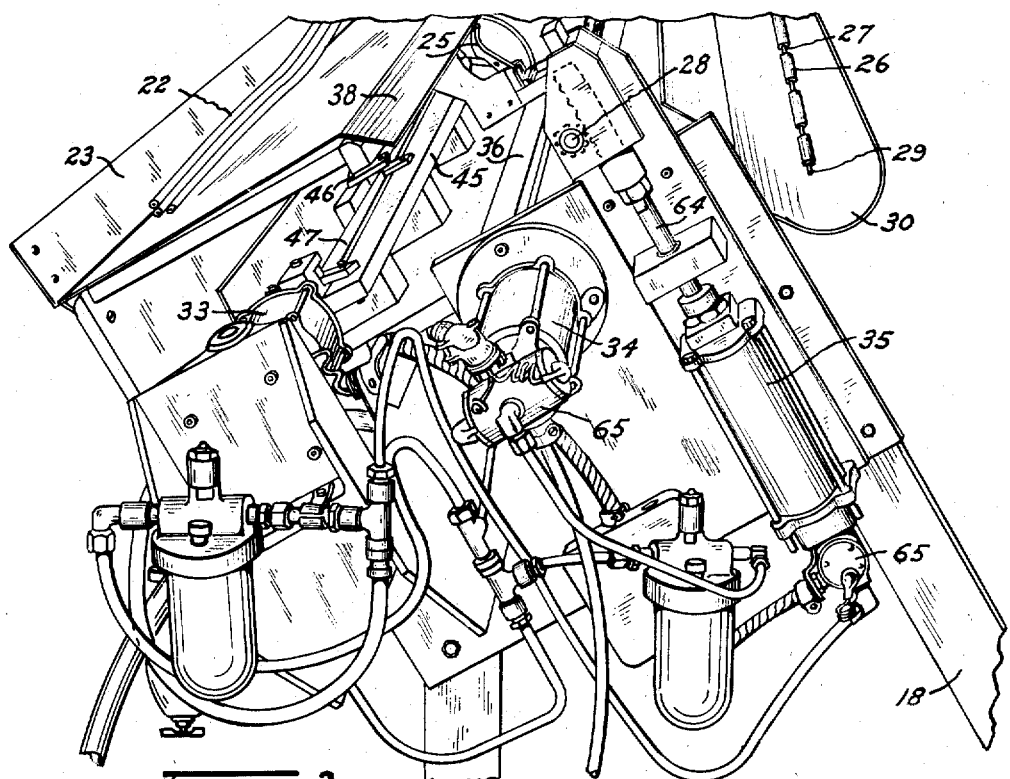
Fig. 3 is another somewhat enlarged and fragmentary perspective view of the same machine but showing the opposite end of the unit from that shown in Fig. 1, and depicting the wire supply pan in normal operating position.

Figs. 8 to 14 inclusive are diagrams showing the progression of steps involved in producing a conductor having five intermediate insulation stripped zones, as performed by the machine of Fig. 1; and Fig. 15 is a side elevation of the finally completed electrical conductor.

The gist of the present invention is the provision of a method for producing successive electrical conductors from insulation covered wires, each having one or more bared zones intermediate its opposite ends, by stripping the insulation away from such zones longitudinally of the wire, and while the apparatus for exploiting this method has been shown herein as being operable by compressed air it is not intended to limit the invention by virtue of this specific showing. It is also contemplated that specific descriptive terms be given the broadest possible interpretation consistent with the actual disclosure, and that other types of mechanisms may be utilized to carry on the steps of the improved method.

Referring to the drawings, the improved insulation severing and stripping machine shown therein, comprises in general a main frame 18 having thereon a series of upwardly open wire guides 19, an end bumper 20, and a hold down finger 21 and a bare wire clamp 21' near the bumper for properly positioning and maintaining one end of each successive end stripped insulation covered wire 22 against longitudinal movement; a wire supply pan 23 mounted upon the frame 18 in front of the guides 19; a series of insulation severing knives 24 and cooperating insulation clamps 24' located adjacent to some of the guides 19, and a similar series of insulation clamping fingers 25 located between the knives 24 and insulation clamps 24' and being operable to hold the wires 22 in position while the insulation 26 is being severed and to subsequently spread the severed sections apart to produce stripped zones 27; an oscillatory ejector shaft 28 for swinging the guides 19 to lift the finished conductors 29 from within the stripping zones and for depositing the same into a discharge trough 30 also mounted upon the frame 18 but in back of the stripping zones; and several air pressure actuated cylinders 31, 32, 33, 34, 35 controlled by electrically actuated solenoids and being operable to actuate the clamps 21', 24', the fingers 25, the knives 24, the stripping motion, and the ejector shaft 28 respectively.

The main frame 18 may be formed of steel bars and plates welded or otherwise firmly united, and has an upper elongated fixed horizontal guideway 36 and a similarly elongated reaction bar 37 mounted thereon, see Fig. 5. The bumper 20 is secured to the frame 18 at one end of the guideway 36 and bar 37, and the end holddown finger 21 which is operable by the air cylinder 31 and the adjacent insulation clamp 21' serve to hold the initially stripped end of each successive wire 22 introduced into the machine in engagement with the bumper 20 while final intermediate stripping is being effected. The wire supply pan 23 also extends approximately throughout the length of the guideway 36 and has an apron 38 directed downwardly toward the upwardly open guides 19 which have rearwardly directed suspension arms 39 adjustably secured to the ejector shaft 28 located above the reaction bar 37, see Fig. 5.

Each set of insulation severing knives 24 and the corresponding insulation clamp 24' is mounted upon an independent carriage 41 all of which are slidable along the guideway 36, and each set of insulation severing knives 24 consists of a rear blade coacting with a roller 42 which rides along the reaction bar 37, and a front blade carried by a transverse slide 43 which carries a roller 44 coacting with a bar 45. This bar 45 is connected by a series of toggles 46 operable by a pull rod 47 and which is slidable on the frame 18, and the bar 45 is transversely movable by the piston of the air cylinder 33 to move the knives 24 and their insulation clamps 24' toward each other to effect cutting and clamping of the insulation 26 of the wires 22 introduced into the guides 19 from the pan 23. Each of the movable blade carrying slides 43 is also provided with an upright rod 48 having thereon a laterally projecting pin 49 which is engageable by a spring pressed plunger 50 slidably mounted in the adjacent carriage 41, and this plunger 50 functions to constantly maintain the rollers 44 in engagement with the toggle actuated bar 45.

Figure 4:
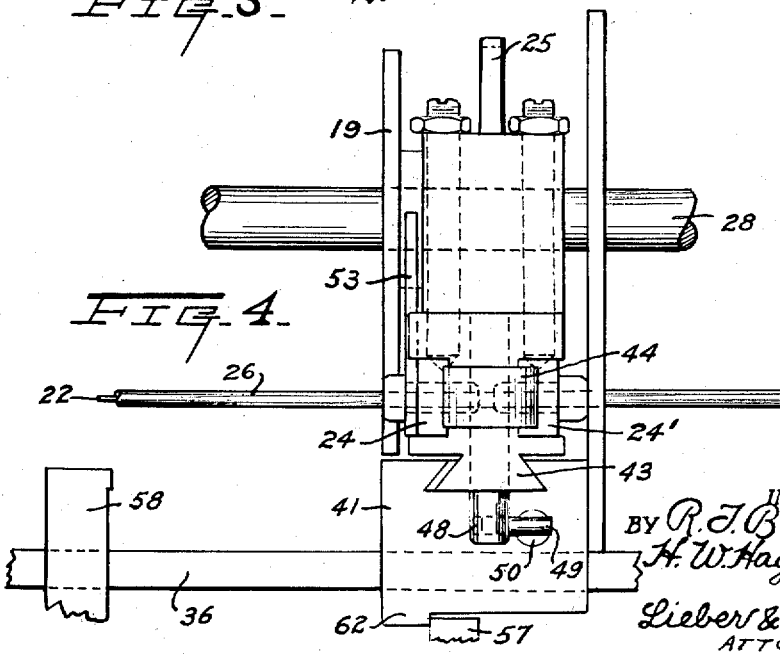
Fig. 4 is a further enlarged fragmentary front view of one of the local insulation cutting and stripping assemblages, showing the adjustable dogs for predetermining the length of each finally stripped portion of the wire.

Each of the wire holddown fingers 25 located between the knives 24 and clamps 24' is swingably suspended from the adjacent carriage 41 by a pivot in 52 and is cooperable with a wire guiding and knock-out projection 53 carried by the slide 43, for releasing sticky insulation 26 of wires 22 adjacent to the corresponding pair of knives 24, see Figs. 4 and 5. The fingers 25 are swingable from open position as shown in dot-and-dash lines in Fig. 5 to hold-down position as depicted in dotted and solid lines, by means of the adjacent air cylinders 32 one of which is mounted upon each carriage 41 and has its piston rod 54 movable downwardly by fluid pressure and upwardly by a compression spring, and each finger 25 is also provided with a manually operable release arm 55 for swinging it upwardly in case a wire 22 fails to be properly deposited within the adjacent guides 19.

The individual knife and finger supporting carriages 41 are movable in opposite directions along the guideway 36 by means of independent sets of stripping dogs 58 and return dogs 57 which are adjustable to different relative positions along a pull rod 59 extending throughout the length of the machine and which is connected to the piston rod 60 of the air cylinder 34 and is sustained against deflection by a support 61, see Figs. 5 and 6. These sets of dogs 57, 58 are adapted to be spaced apart along the pull rod 59 so as to insure the spacing desired between the successive stripped zones 27, and the dogs of each set are also capable of being spaced apart distances equal to the length of the individual final zones 27 desired; and the properly positioned dogs may be locked in place by screws, as in Fig. 5. The stripping dogs 58 are adapted to coact with the trailing ends of the adjacent carriages 41, while the return dogs 57 are engageable with lower projections 62 formed on these carriages, and the end of the pull rod 59 remote from the cylinder 34 is provided with an adjustable stop 63.

The oscillatory ejector shaft 28 is mounted in bearings carried by the main frame 18 and is oscillatable to swing the guides 19 upwardly away from the cutting and stripping area upon completion of a conductor 29 by means of the air cylinder 35, the piston rod 64 of which is connected by a rack and pinion to an end of the shaft 28. Each of the air cylinders 33, 34, 35 is of the double-acting type and is provided with a solenoid 65 actuated compressed air admission and exhaust valve, and these solenoids 65 are controllable by means of electric push-button switches 66, 67, 68 mounted on the front of the frame 18, see Figs. 1 and 3. The electrical control system involves several other controls and switches adapted to cause the machine to function automatically when properly adjusted to produce final conductors 29 in rapid succession after the mechanism has been initially set up.

In order to prepare the stripping unit for normal operation all air pressure should be released from the cylinders 31, 32, 33, 34, 35 and a master switch not shown, should be manipulated to disconnect the electricity. Two samples, one merely having the insulation severed as in Fig. 8, and the other corresponding to a final conductor 29 such as shown in Fig. 15 should then be carefully prepared manually from insulated wire stock in which the insulation 26 has not been molded too tightly onto the wire and may therefore be shifted longitudinally, in order to predetermine the positions at which the knives 24 must be located and the distances at which the dogs 57, 58 must be spaced apart so that the final sample of Fig. 15 may be accurately reproduced. With the fingers 25 elevated as shown in dot-and-dash lines in Fig. 5, and with the knife blades separated and the end clamp 21 released, the sample wire and conductor may then be successively inserted within the guides 19 with the left stripped end of the wire 22 in each case in contact with the bumper 20, whereupon the finger 21 and clamp 21' should be brought into action to firmly hold the sample against longitudinal displacement.

The carriages 41 should then be adjusted along the guideway 36 by using the sample of Fig. 8 to properly position the knives 24 as in Fig. 8 at the successive localities where the insulation 26 of the successive wires 22 is to be severed; and by using the sample of Fig. 15 the dogs 57, 58 should be adjusted along the pull rod 59 to accurately predetermine the length of each stripped zone required. This adjustment of the dogs 57, 58 must be made while the end of the pull rod 59 remote from its actuating cylinder 34 is in contact with the stop 63, and with all parts thus adjusted a wire 22 should be applied and the fingers 25 should be lowered into hold down position, the clamps 24' should be operated whereupon a trial run should be made in order to ascertain whether the sample conductor will be reproduced after the machine is placed in automatic operation. If so, the unit is ready for normal operation and may be connected to suitable sources of air under pressure and electric current by throwing the master switch, while an abundant supply of insulated wires 22 having at least one end stripped for cooperation with the bumper 20 and holding clamp should be available in the supply pan 23.

After these preliminary steps have been taken, the mechanism is operable as follows to carry on the improved stripping method. The operator positioned in front of the machine can conveniently deposit each successive wire 22 removed from the pan 23 into the guides 19 and manipulate the push-button switch 67 to cause the air cylinders 31, 32 to lower the fingers 21, 25 and to thereby hold the wire 22 down adjacent to each set of separated knives 24 and clamps 24' while the carriages 41 are at rest. The push-button switches 66, 68 may thereafter also be manipulated together to automatically cause the air cylinder 33 and the toggles 46 coacting with the slides 43 to close the clamps 24' and to move the knife blades 24 toward each other and to thus sever the insulation adjacent to the left end of each zone which is to be subsequently stripped, as shown in Fig. 8.

When the insulation has been thus cut by the knives 24, the pull rod 59 will be moved longitudinally by the air cylinder 34 to progressively move the carriages 41 with the knife blades closed and the fingers 25 and clamps 24' in clamping engagement with the adjacent severed sections of insulation 26 along the wire 22 which remains held against longitudinal displacement by the finger 21 and clamp 21', as depicted in Figs. 9 to 14 inclusive. While this progressive stripping action is taking place by moving the successive severed sections of insulation bodily along the wire, the end section 26' of the insulation 26 will be gradually stripped from the free end of the wire 22 as the successive stripped zones 27 are produced, and when the stripping cycle has been completed and a conductor 29 such as shown in Fig. 15 has been produced, the machine will stop and a subsequent wire may be stripped and a repetition of the same cycle may be effected in like manner.

During the stripping operations, the dogs 57, 58 secured to the pull rod 59 will cooperate with the carriages 41 to accurately produce medially stripped zones 27 of predetermined length, and the knives 24 mounted upon the carriages 41 will also accurately locate the several bared zones. The total length of the insulation end section 26' will be equal to the sum of the lengths of the intermediate zones 27 regardless of variations in length of the individual zones and irrespective of the location of the knives 24; and while the stripping action in the mechanism as shown progresses from the free end of the wire, it may also be caused to progress from the clamped wire end without departing from the present improved method by merely slightly varying the control systems. The pull rod 59 picks up and moves the carriages 41 consecutively in one direction until all stripping operations have been performed, and it thereafter likewise moves these carriages in the opposite direction up to the starting point.

From the foregoing detailed description it will be apparent that the present invention in fact provides a simple method of medially stripping insulation from one or more zones intermediate the ends of a wire 22, and also provides improved apparatus for safely, rapidly and effectively exploiting the method steps. The machine performs the successive steps automatically and with utmost precision, and it is also extremely flexible in its adaptations since the locations and the length of the several bared zones 27 may be conveniently varied to meet different conditions of use of the final conductors 29. It is also noteworthy, that by moving the severed sections of insulation bodily along the wire, the lengths of the individual sections are not altered by deformation of the sections, so that the final conductors are accurately produced and reproduced for any predetermined setting of the mechanism. Whenever one of these conductors 29 has been completed, the ejector cylinder 35 functions to oscillate the shaft 28 so as to first lift and deposit the finished article into the trough 30, and to thereafter return the guides 19 to wire receiving position, and these guides 19 may be located at any desired position along the shaft 28 where they will not interfere with the movement of the carriages 41. The invention has gone into highly satisfactory and successful operation to produce stripped wires 29 with utmost precision.

It is to be understood that it is not desired to limit this invention to the exact steps of the method or to the precise details of construction of the machine, described and shown herein, for various modifications within the scope of the appended claims may occur to persons skilled in the art.

We claim:

1. In a mechanism for stripping an insulated wire at locations intermediate its ends, means for holding the wire at an end to prevent longitudinal displacement thereof, clamps spaced from each other and being cooperable with the insulation of the wire at spaced localities, means for transversely severing the insulation into end abutting sections in the spaces between said clamps, and means for moving said clamps longitudinally of the wire to bodily displace the successive severed sections and to produce stripped zones between the adjacent severed ends of the insulation sections.

2. In a mechanism for stripping an insulated wire at locations intermediate its ends, means for holding the wire at an end to prevent longitudinal displacement thereof, clamps spaced from each other and being cooperable with the insulation of the wire at spaced localities, means for transversely severing the insulation into end abutting sections in the spaces between said clamps, means for moving said clamps longitudinally of the wire to bodily move the successive severed sections along the wire and to produce stripped zones between the adjacent severed ends of the insulation sections, and means for releasing said holding means and said clamps and for ejecting the locally stripped wires.

3. In a mechanism for stripping an insulated wire at locations intermediate its ends, means for holding the wire at an end to prevent longitudinal displacement thereof, fluid pressure actuated means for clamping the wire at spaced localities and for transversely severing the insulation into sections in the spaces between said clamps, and other fluid pressure actuated means for moving said clamps along the wire to bodily move the successive severed sections along the wire and to separate the severed insulation sections to thereby produce stripped local zones.

4. The method of stripping an insulated wire intermediate its ends, which comprises, holding the wire at one end to prevent longitudinal displacement thereof, clamping the insulation of the held wire at spaced localities, transversely severing the insulation into end abutting sections in the spaces between the clamped localities, and moving the clamped sections longitudinally of the wire to bodily displace the successive severed sections and to produce stripped zones between the adjacent severed ends of the insulated sections.

References Cited in the file of this patent

UNITED STATES PATENTS

| 1,800,917 | Weis | Apr. 14, 1931 |
| 1,802,462 | Dumroese | Apr. 28, 1931 |
| 2,383,479 | Gordon | Aug. 28, 1945 |
| 2,563,911 | Beck | Aug. 14, 1951 |
| 2,718,802 | Cook | Sept. 27, 1955 |
| 2,743,633 | Powell | May 1, 1956 |
| 2,756,619 | Scharf | July 31, 1956 |
| 2,762,247 | Staudt | Sept. 11, 1956 |
| 2,765,684 | Reck | Oct. 9, 1956 |